US012573337B2

(12) United States Patent
Yang

(10) Patent No.: US 12,573,337 B2
(45) Date of Patent: Mar. 10, 2026

(54) DRIVER HAVING A PLURALITY OF INPUT CIRCUITS AND OUTPUT CIRCUITS AND ELECTRONIC DEVICE

(71) Applicant: Samsung Display Co., LTD., Yongin-si (KR)

(72) Inventor: Jihoon Yang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/982,622

(22) Filed: Dec. 16, 2024

(65) Prior Publication Data

US 2025/0349242 A1 Nov. 13, 2025

(30) Foreign Application Priority Data

May 7, 2024 (KR) ........................ 10-2024-0059771

(51) Int. Cl.
*G09G 3/20* (2006.01)
*G09G 3/32* (2016.01)

(52) U.S. Cl.
CPC ....... *G09G 3/32* (2013.01); *G09G 2300/0842* (2013.01); *G09G 2310/0286* (2013.01); *G09G 2310/08* (2013.01)

(58) Field of Classification Search
CPC ............. G09G 3/32; G09G 2300/0842; G09G 2310/0286; G09G 2310/08
See application file for complete search history.

(56) References Cited

U.S. PATENT DOCUMENTS

2022/0036802 A1* 2/2022 Kim ..................... G09G 3/3266
2024/0346997 A1* 10/2024 Kim ..................... G09G 3/3225

FOREIGN PATENT DOCUMENTS

KR 10-1963595 4/2019
KR 10-2020-0013923 2/2020
KR 10-2588078 10/2023

* cited by examiner

*Primary Examiner* — Kwang-Su Yang
(74) *Attorney, Agent, or Firm* — F. CHAU & ASSOCIATES, LLC

(57) ABSTRACT

At least one stage of a driver includes a first input circuit that transfers an input signal to a first node in response to a clock signal, a second input circuit that transfers an inverted input signal inverted from the input signal to a second node in response to the clock signal, a first output circuit that outputs a low gate voltage as an output signal in response to a voltage of the first node, and that outputs a high gate voltage as the output signal in response to a voltage of the second node, and a second output circuit that outputs the high gate voltage as an inverted output signal inverted from the output signal in response to the voltage of the first node, and that outputs the low gate voltage as the inverted output signal in response to the voltage of the second node.

20 Claims, 11 Drawing Sheets

TP1

DRIVER HAVING A PLURALITY OF INPUT CIRCUITS AND OUTPUT CIRCUITS AND ELECTRONIC DEVICE

CROSS-REFERENCE TO RELATED APPLICATION(S)

This application claims priority to and benefits of Korean Patent Application No. 10-2024-0059771 under 35 USC § 119 filed on May 7, 2024 in the Korean Intellectual Property Office, the entire contents of which are incorporated herein by reference.

BACKGROUND

1. Technical Field

Embodiments relate to a display device, and to a driver that outputs an output signal and an inverted output signal, and a display device including the driver.

2. Description of the Related Art

A driver (for example, a gate driver and/or an emission driver) of a display device may sequentially provide signals (for example, gate signals and/or emission signals) to pixels of a display panel on a row-by-row basis. To sequentially provide the signals on the row-by-row basis, the driver may be implemented in a form of a shift register including a plurality of stages.

Recently, a pixel including both different types of transistors, for example a P-type metal oxide semiconductor ("PMOS") transistor and an N-type metal oxide semiconductor ("NMOS") transistor, has been developed. The pixel may receive not only an output signal but also an inverted output signal inverted from the output signal. In order to provide the output signal and the inverted output signal to the pixel, a display device may include a driver for outputting the output signal, and a separate driver for outputting the inverted output signal.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

An embodiment provides a driver capable of outputting both an output signal and an inverted output signal.

An embodiment provides a display device including a driver capable of outputting both an output signal and an inverted output signal.

According to embodiments, there is provided a driver that may include a plurality of stages. At least one stage of the plurality of stages may include a first input circuit that transfers an input signal to a first node in response to a clock signal, a second input circuit that transfers an inverted input signal inverted from the input signal to a second node in response to the clock signal, a first output circuit that outputs a low gate voltage as an output signal in response to a voltage of the first node, and that outputs a high gate voltage as the output signal in response to a voltage of the second node, and a second output circuit that outputs the high gate voltage as an inverted output signal inverted from the output signal in response to the voltage of the first node, and that outputs the low gate voltage as the inverted output signal in response to the voltage of the second node.

In embodiments, the at least one stage may further include a first transistor connected to the first node, and to selectively separate the first node into a first-first node and a first-second node, and a second transistor connected to the second node, and to selectively separate the second node into a second-first node and a second-second node.

In embodiments, each of the first transistor and the second transistor may be an always-on transistor including a gate which receives the low gate voltage.

In embodiments, the first transistor may include a gate which receives the low gate voltage, a first terminal connected to the first-first node, and a second terminal connected to the first-second node, and the second transistor may include a gate which receives the low gate voltage, a first terminal connected to the second-first node, and a second terminal connected to the second-second node.

In embodiments, the first input circuit may include a third transistor that transfers the input signal to the first-first node in response to the clock signal.

In embodiments, the third transistor may include a gate which receives the clock signal, a first terminal which receives the input signal, and a second terminal connected to the first-first node.

In embodiments, the second input circuit may include a fourth transistor that transfers the inverted input signal to the second-first node in response to the clock signal.

In embodiments, the fourth transistor may include a gate which receives the clock signal, a first terminal which receives the inverted input signal, and a second terminal connected to the second-first node.

In embodiments, the first output circuit may include a first capacitor connected between the first-second node and an output node from which the output signal is output, and that boosts a voltage of the first-second node, a fifth transistor that outputs the low gate voltage as the output signal in response to the voltage of the first-second node, and a sixth transistor that outputs the high gate voltage as the output signal in response to a voltage of the second-second node.

In embodiments, the first capacitor may include a first electrode connected to the first-second node, and a second electrode connected to the output node, the fifth transistor may include a gate connected to the first-second node, a first terminal which receives the low gate voltage, and a second terminal connected to the output node, and the sixth transistor may include a gate connected to the second-second node, a first terminal connected to the output node, and a second terminal which receives the high gate voltage.

In embodiments, the second output circuit may include a seventh transistor that outputs the high gate voltage as the inverted output signal in response to a voltage of the first-second node, a second capacitor connected between the second-second node and an inverted output node from which the inverted output signal is output, and that boosts a voltage of the second-second node, and an eighth transistor that outputs the low gate voltage as the inverted output signal in response to the voltage of the second-second node.

In embodiments, the seventh transistor may include a gate connected to the first-second node, a first terminal which receives the high gate voltage, and a second terminal connected to the inverted output node, the second capacitor may include a first electrode connected to the second-second node, and a second electrode connected to the inverted output node, and the eighth transistor may include a gate connected to the second-second node, a first terminal connected to the inverted output node, and a second terminal which receives the low gate voltage.

In embodiments, transistors included in the at least one stage may be P-type metal oxide semiconductor transistors.

According to embodiments, there is provided a driver that may include a plurality of stages. At least one stage of the plurality of stages may include a first transistor including a gate which receives a low gate voltage, a first terminal connected to a first-first node, and a second terminal connected to a first-second node, a second transistor including a gate which receives the low gate voltage, a first terminal connected to a second-first node, and a second terminal connected to a second-second node, a third transistor including a gate which receives a clock signal, a first terminal which receives an input signal, and a second terminal connected to the first-first node, a fourth transistor including a gate which receives the clock signal, a first terminal which receives an inverted input signal, and a second terminal connected to the second-first node, a first capacitor including a first electrode connected to the first-second node, and a second electrode connected to an output node, a fifth transistor including a gate connected to the first-second node, a first terminal which receives the low gate voltage, and a second terminal connected to the output node, a sixth transistor including a gate connected to the second-second node, a first terminal connected to the output node, and a second terminal which receives a high gate voltage, a seventh transistor including a gate connected to the first-second node, a first terminal which receives the high gate voltage, and a second terminal connected to an inverted output node, a second capacitor including a first electrode connected to the second-second node, and a second electrode connected to the inverted output node, and an eighth transistor including a gate connected to the second-second node, a first terminal connected to the inverted output node, and a second terminal which receives the low gate voltage.

In embodiments, the first transistor, the second transistor, the third transistor, the fourth transistor, the fifth transistor, the sixth transistor, the seventh transistor and the eighth transistor may be P-type metal oxide semiconductor transistors.

According to embodiments, there is provided a display device that may include a display panel including a plurality of pixels, a data driver that provides data signals to the plurality of pixels, a gate driver that provides gate signals to the plurality of pixels, an emission driver that provides emission signals to the plurality of pixels, and a controller that controls the data driver, the gate driver and the emission driver. At least one of the gate driver and the emission driver may include a plurality of stages. At least one stage of the plurality of stages may include a first input circuit that transfers an input signal to a first node in response to a clock signal, a second input circuit that transfers an inverted input signal inverted from the input signal to a second node in response to the clock signal, a first output circuit that outputs a low gate voltage as an output signal in response to a voltage of the first node, and to output a high gate voltage as the output signal in response to a voltage of the second node, and a second output circuit that outputs the high gate voltage as an inverted output signal inverted from the output signal in response to the voltage of the first node, and that outputs the low gate voltage as the inverted output signal in response to the voltage of the second node.

In embodiments, the gate signals may include a write signal, an inverted write signal inverted from the write signal, an initialization signal and a bypass signal, and each of the plurality of pixels may include a storage capacitor including a first electrode which receives a first power supply voltage, and a second electrode, a first pixel transistor including a gate connected to the second electrode of the storage capacitor, a first terminal, and a second terminal, a second pixel transistor including a gate which receives the write signal, a first terminal connected to a data line, and a second terminal connected to the first terminal of the first pixel transistor, a third pixel transistor including a gate which receives the inverted write signal, a first terminal connected to the second terminal of the first pixel transistor, and a second terminal connected to the gate of the first pixel transistor, a fourth pixel transistor including a gate which receives the initialization signal, a first terminal connected to the gate of the first pixel transistor, and a second terminal which receives an initialization voltage, a fifth pixel transistor including a gate which receives a corresponding emission signal, a first terminal which receives the first power supply voltage, and a second terminal connected to the first terminal of the first pixel transistor, a sixth pixel transistor including a gate which receives the corresponding emission signal, a first terminal connected to the second terminal of the first pixel transistor, and a second terminal, a seventh pixel transistor including a gate which receives the bypass signal, a first terminal which receives an anode initialization voltage, and a second terminal, and a light emitting element including an anode connected to the second terminal of the sixth pixel transistor and the second terminal of the seventh pixel transistor, and a cathode which receives a second power supply voltage. The output signal output from the first output circuit may be the write signal, and the inverted output signal output from the second output circuit may be the inverted write signal.

In embodiments, the gate signals may include a write signal, a compensation signal, an initialization signal, a bypass signal and an inverted bypass signal inverted from the bypass signal, and each of the plurality of pixels may include a storage capacitor including a first electrode which receives a first power supply voltage, and a second electrode, a first pixel transistor including a gate connected to the second electrode of the storage capacitor, a first terminal, and a second terminal, a second pixel transistor including a gate which receives the write signal, a first terminal connected to a data line, and a second terminal connected to the first terminal of the first pixel transistor, a third pixel transistor including a gate which receives the compensation signal, a first terminal connected to the second terminal of the first pixel transistor, and a second terminal connected to the gate of the first pixel transistor, a fourth pixel transistor including a gate which receives the initialization signal, a first terminal connected to the gate of the first pixel transistor, and a second terminal which receives an initialization voltage, a fifth pixel transistor including a gate which receives a corresponding emission signal, a first terminal which receives the first power supply voltage, and a second terminal connected to the first terminal of the first pixel transistor, a sixth pixel transistor including a gate which receives the corresponding emission signal, a first terminal connected to the second terminal of the first pixel transistor, and a second terminal, a seventh pixel transistor including a gate which receives the inverted bypass signal, a first terminal which receives an anode initialization voltage, and a second terminal, an eighth pixel transistor including a gate which receives the bypass signal, a first terminal which receives a bias voltage, and a second terminal connected to the first terminal of the first pixel transistor, and a light emitting element including an anode connected to the second terminal of the sixth pixel transistor and the second terminal of the seventh pixel transistor, and a cathode which receives a second power supply voltage. The output signal output from the first output circuit may be the bypass signal, and the inverted output signal output from the second output circuit may be the inverted bypass signal.

In embodiments, the gate signals may include a write signal, a compensation signal, an initialization signal and a bypass signal, and each of the plurality of pixels may include a storage capacitor including a first electrode which receives a first power supply voltage, and a second electrode, a first pixel transistor including a gate connected to the second electrode of the storage capacitor, a first terminal, and a second terminal, a second pixel transistor including a gate which receives the write signal, a first terminal connected to a data line, and a second terminal connected to the first terminal of the first pixel transistor, a third pixel transistor including a gate which receives the compensation signal, a first terminal connected to the second terminal of the first pixel transistor, and a second terminal connected to the gate of the first pixel transistor, a fourth pixel transistor including a gate which receives the initialization signal, a first terminal connected to the gate of the first pixel transistor, and a second terminal which receives an initialization voltage, a fifth pixel transistor including a gate which receives a corresponding emission signal, a first terminal which receives the first power supply voltage, and a second terminal connected to the first terminal of the first pixel transistor, a sixth pixel transistor including a gate which receives an inverted emission signal inverted from the corresponding emission signal, a first terminal connected to the second terminal of the first pixel transistor, and a second terminal, a seventh pixel transistor including a gate which receives the bypass signal, a first terminal which receives an anode initialization voltage, and a second terminal, an eighth pixel transistor including a gate which receives the bypass signal, a first terminal which receives a bias voltage, and a second terminal connected to the first terminal of the first pixel transistor, and a light emitting element including an anode connected to the second terminal of the sixth pixel transistor and the second terminal of the seventh pixel transistor, and a cathode which receives a second power supply voltage. The output signal output from the first output circuit may be the corresponding emission signal, and the inverted output signal output from the second output circuit may be the inverted emission signal.

In embodiments, the at least one stage may further include a first transistor that separates the first node into a first-first node and a first-second node, and including a gate which receives the low gate voltage, a first terminal connected to the first-first node, and a second terminal connected to the first-second node, and a second transistor that separates the second node into a second-first node and a second-second node, and including a gate which receives the low gate voltage, a first terminal connected to the second-first node, and a second terminal connected to the second-second node. The first input circuit may include a third transistor including a gate which receives the clock signal, a first terminal which receives the input signal, and a second terminal connected to the first-first node. The second input circuit may include a fourth transistor including a gate which receives the clock signal, a first terminal which receives the inverted input signal, and a second terminal connected to the second-first node. The first output circuit may include a first capacitor including a first electrode connected to the first-second node, and a second electrode connected to an output node from which the output signal is output, a fifth transistor including a gate connected to the first-second node, a first terminal which receives the low gate voltage, and a second terminal connected to the output node, and a sixth transistor including a gate connected to the second-second node, a first terminal connected to the output node, and a second terminal which receives the high gate voltage. The second output circuit may include a seventh transistor including a gate connected to the first-second node, a first terminal which receives the high gate voltage, and a second terminal connected to an inverted output node from which the inverted output signal is output, a second capacitor may include a first electrode connected to the second-second node, and a second electrode connected to the inverted output node, and an eighth transistor may include a gate connected to the second-second node, a first terminal connected to the inverted output node, and a second terminal which receives the low gate voltage.

As described above, in a driver and a display device according to embodiments, at least one stage may include a first output circuit which outputs an output signal in response to a voltage of a first node (for example, a Q node) and a voltage of a second node (for example, a QB node), and a second output circuit which outputs an inverted output signal inverted from the output signal in response to the voltage of the first node and the voltage of the second node. Accordingly, the driver may output both the output signal and the inverted output signal, and a size of the driver may be reduced.

BRIEF DESCRIPTION OF THE DRAWINGS

Illustrative, non-limiting embodiments will be more clearly understood from the following detailed description in conjunction with the accompanying drawings in which.

DETAILED DESCRIPTION OF THE EMBODIMENTS

Figure 1:
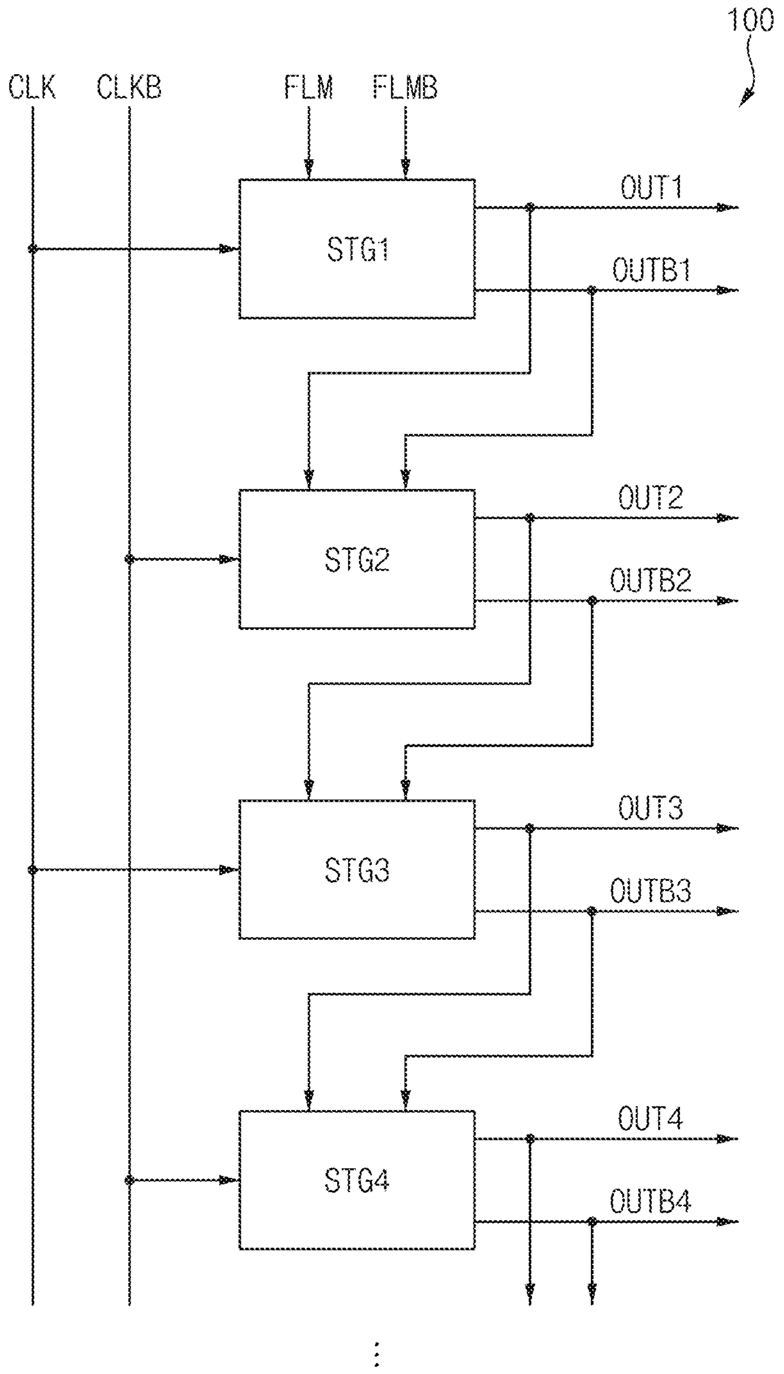
FIG. 1 is a block diagram illustrating a driver according to embodiments.

The embodiments are described more fully hereinafter with reference to the accompanying drawings. Like or similar reference numerals refer to like or similar elements throughout.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

In the drawings, sizes, thicknesses, ratios, and dimensions of the elements may be exaggerated for ease of description and for clarity. Like numbers refer to like elements throughout.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

The terms "overlap" or "overlapped" mean that a first object may be above or below or to a side of a second object, and vice versa. Additionally, the term "overlap" may include layer, stack, face or facing, extending over, covering, or partly covering or any other suitable term as would be appreciated and understood by those of ordinary skill in the art.

The terms "face" and "facing" mean that a first element may directly or indirectly oppose a second element. In a case in which a third element intervenes between the first and second element, the first and second element may be understood as being indirectly opposed to one another, although still facing each other.

When an element is described as 'not overlapping' or 'to not overlap' another element, this may include that the elements are spaced apart from each other, offset from each other, or set aside from each other or any other suitable term as would be appreciated and understood by those of ordinary skill in the art.

The terms "comprises," "comprising," "includes," and/or "including," "has," "have," and/or "having," and variations thereof when used in this specification, specify the presence of stated features, integers, steps, operations, elements, components, and/or groups thereof, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element (or a region, a layer, a portion, or the like) is referred to as "being on", "connected to" or "coupled to" another element in the specification, it can be directly disposed on, connected or coupled to another element mentioned above, or intervening elements may be disposed therebetween.

It will be understood that the terms "connected to" or "coupled to" may include a physical or electrical connection or coupling.

Embodiments may be described and illustrated in the accompanying drawings in terms of functional blocks, units, and/or modules.

Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies.

In the case of the blocks, units, and/or modules being implemented by microprocessors or other similar hardware, they may be programmed and controlled using software (for example, microcode) to perform various functions discussed herein and may optionally be driven by firmware and/or software.

It is also contemplated that each block, unit, and/or module may be implemented by dedicated hardware, or as a combination of dedicated hardware to perform some functions and a processor (for example, one or more programmed microprocessors and associated circuitry) to perform other functions.

Each block, unit, and/or module of embodiments may be physically separated into two or more interacting and discrete blocks, units, and/or modules without departing from the scope of the disclosure.

Further, the blocks, units, and/or modules of embodiments may be physically combined into more complex blocks, units, and/or modules without departing from the scope of the disclosure.

Figure 2:
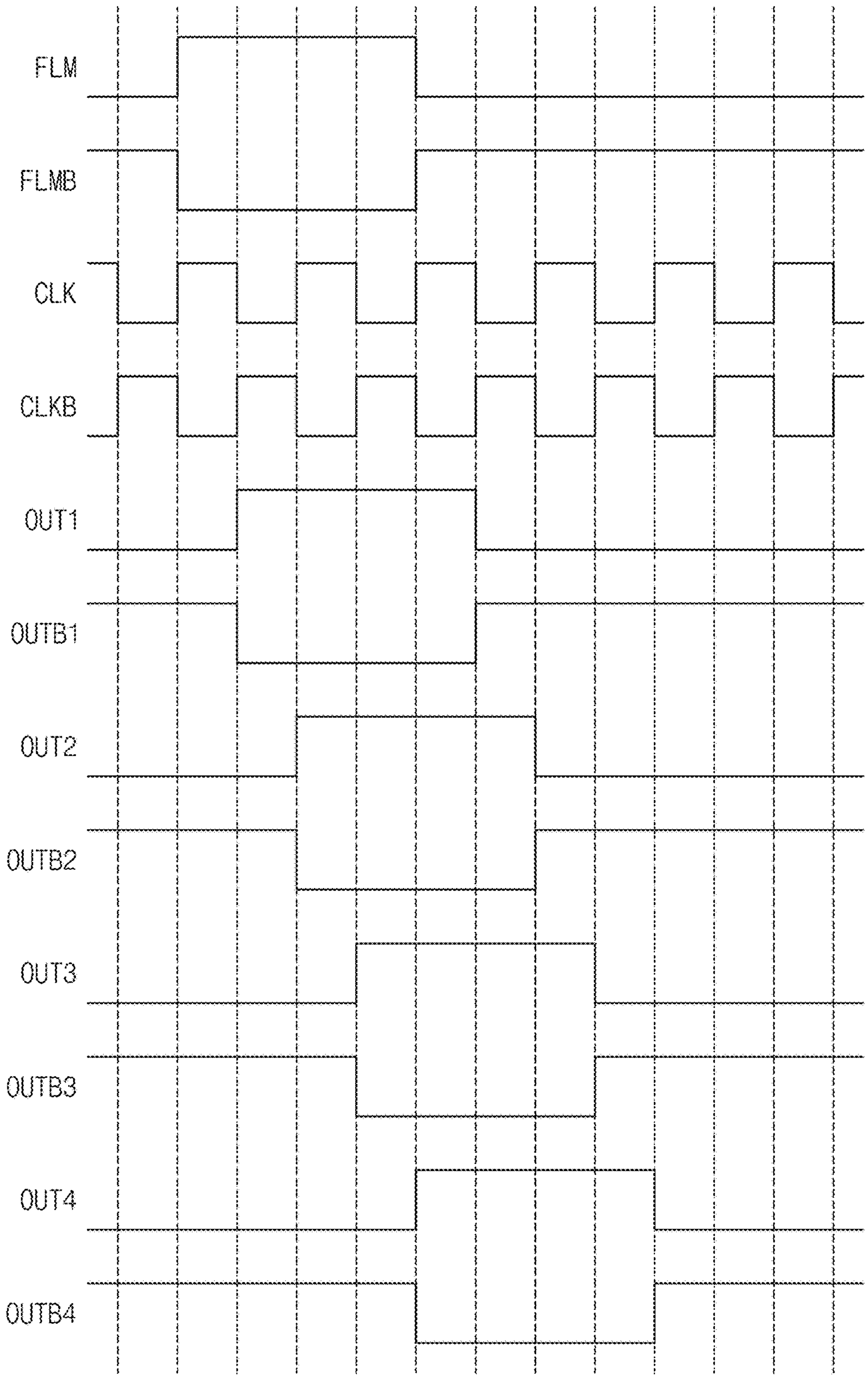
FIG. 2 is a timing diagram for describing an example of an operation of a driver of FIG. 1.

FIG. 1 is a block diagram illustrating a driver according to embodiments, and FIG. 2 is a timing diagram for describing an example of an operation of a driver of FIG. 1.

Referring to FIG. 1, a driver 100 according to embodiments may include a plurality of stages STG1, STG2, STG3, STG4, etc. The driver 100 may be implemented in a form of a shift register in which the plurality of stages STG1, STG2, STG3, STG4, etc. sequentially outputs not only output signals OUT1, OUT2, OUT3, OUT4, etc., but also inverted output signals OUTB1, OUTB2, OUTB3, OUTB4, etc. inverted from the output signals OUT1, OUT2, OUT3, OUT4, etc. For example, phases and/or voltage levels of the inverted output signals OUTB1, OUTB2, OUTB3, OUTB4, etc. may be inverted from those of the output signals OUT1, OUT2, OUT3, OUT4, etc. In an embodiment, the driver 100 may be formed in a display region of a display panel of a display device. In other embodiments, the driver 100 may be formed in a peripheral region of the display panel adjacent to the display region.

The plurality of stages STG1, STG2, STG3, STG4, etc. may sequentially output the output signals OUT1, OUT2, OUT3, OUT4, etc. and the inverted output signals OUTB1, OUTB2, OUTB3, OUTB4, etc. based on a start signal FLM, an inverted start signal FLMB inverted from the start signal FLM, a clock signal CLK, and an inverted clock signal CLKB inverted from the clock signal CLK. Further, a first stage STG1 may receive the start signal FLM and the inverted start signal FLMB as an input signal and an inverted input signal, respectively, and each of subsequent stages STG2, STG3, STG4, etc. may receive the output signal OUT1, OUT2, OUT3, OUT4, etc. and the inverted output signal OUTB1, OUTB2, OUTB3, OUTB4, etc. of a previous stage as an input signal and an inverted input signal, respectively. For example, a second stage STG2 may receive a first output signal OUT1 and a first inverted output signal OUTB1 of the first stage STG1 as an input signal and an inverted input signal, respectively, a third stage STG3 may receive a second output signal OUT2 and a second inverted output signal OUTB2 of the second stage STG2 as an input signal and an inverted input signal, respectively, and a fourth stage STG4 may receive a third output signal OUT3 and a third inverted output signal OUTB3 of the third stage STG3 as an input signal and an inverted input signal, respectively.

Further, in an embodiment, each odd-numbered stage STG1, STG3, etc. may output the output signal OUT1, OUT3, etc. and the inverted output signal OUTB1, OUTB3, etc. in response to the clock signal CLK, and each even-numbered stage STG2, STG4, etc. may output the output signal OUT2, OUT4, etc. and the inverted output signal OUTB2, OUTB4, etc. in response to the inverted clock signal CLKB. For example, as illustrated in FIGS. 1 and 2, in case that the clock signal CLK becomes a low level while the start signal FLM has the low level and the inverted start signal FLMB has a high level, the first stage STG1 may output the first output signal OUT1 having the low level and the first inverted output signal OUTB1 having the high level. Further, in case that the inverted clock signal CLKB becomes the low level while the first output signal OUT1 has the low level and the first inverted output signal OUTB1 has the high level, the second stage STG2 may output the second output signal OUT2 having the low level and the second inverted output signal OUTB2 having the high level. Further, in case that the clock signal CLK becomes the low level while the second output signal OUT2 has the low level and the second inverted output signal OUTB2 has the high level, the third stage STG3 may output the third output signal OUT3 having the low level and the third inverted output signal OUTB3 having the high level. Further, in case that the inverted clock signal CLKB becomes the low level while the third output signal OUT3 having the low level and the third inverted output signal OUTB3 having the high level, the fourth stage STG4 may output a fourth output signal OUT4 having the low level and a fourth inverted output signal OUTB4 having the high level. In this manner, the plurality of stages STG1, STG2, STG3, STG4, etc. may sequentially output the output signals OUT1, OUT2, OUT3, OUT4, etc. and the inverted output signals OUTB1, OUTB2, OUTB3, OUTB4, etc. by delaying or shifting the output signals OUT1, OUT2, OUT3, OUT4, etc. and the inverted output signals OUTB1, OUTB2, OUTB3, OUTB4, etc. by one horizontal time 1H (or by half a period of the clock signal CLK).

Although FIG. 2 illustrates an example in which each of the clock signal CLK and the inverted clock signal CLKB has a clock duty of about 50%, the clock signal CLK and the inverted clock signal CLKB provided to the driver 100 according to embodiments are not limited to the example of FIG. 2. For example, to ensure that a low period of the clock signal CLK and a low period of the inverted clock signal CLKB do not overlap each other, each of the clock signal CLK and the inverted clock signal CLKB may have a low period shorter than a high period, and the low period of the clock signal CLK and the low period of the inverted clock signal CLKB may have a substantially constant time interval.

Figure 3:
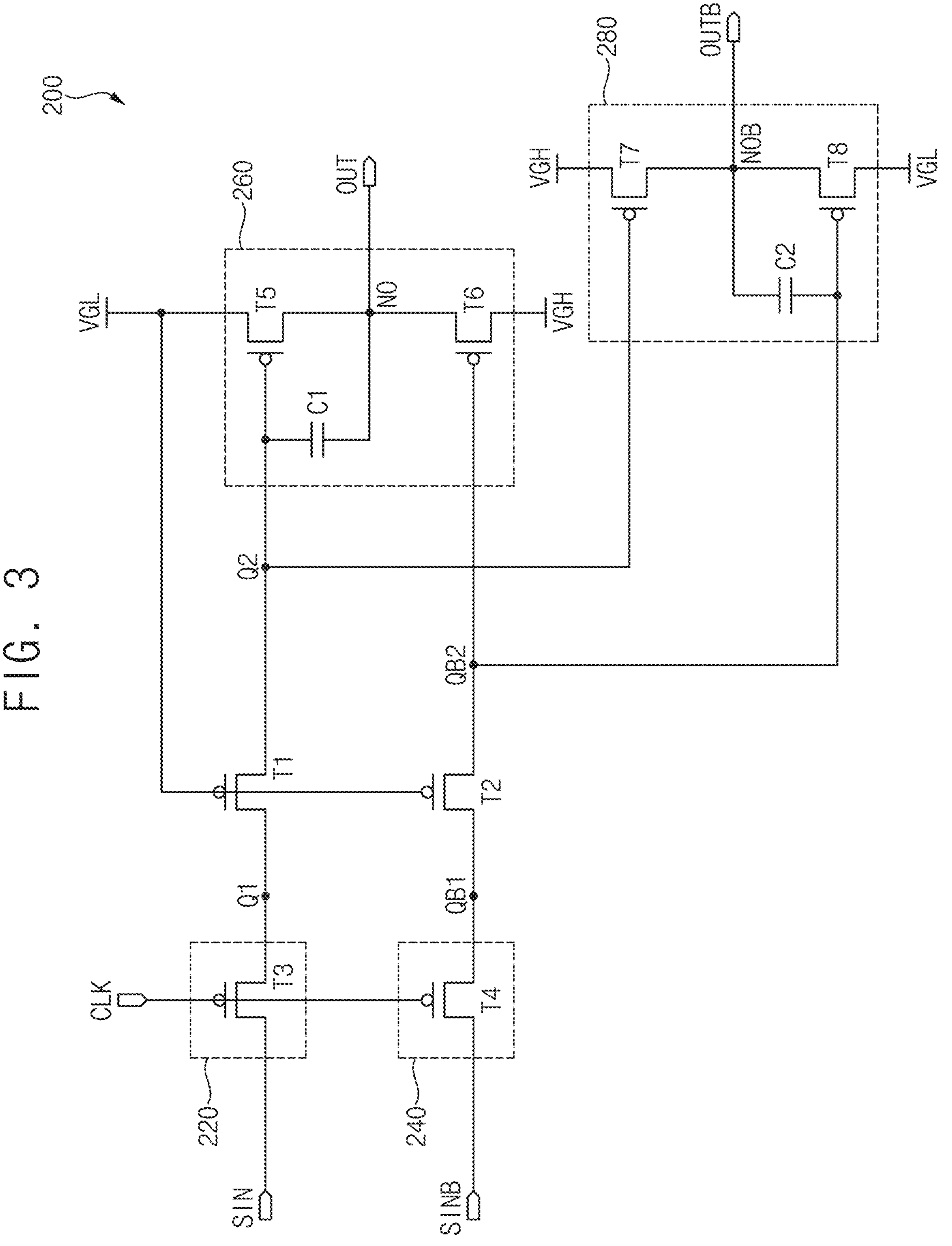
FIG. 3 is a schematic diagram of an equivalent circuit illustrating a stage of a driver according to embodiments.

FIG. 3 is a schematic diagram of an equivalent circuit illustrating a stage of a driver according to embodiments.

Referring to FIG. 3, at least one stage 200 of a driver according to embodiments may include a first input circuit 220 that transfers an input signal SIN to a first node (for example, referred to as a "Q node") Q1 and Q2 in response to a clock signal CLK, a second input circuit 240 that transfers an inverted input signal SINB inverted from the input signal SIN to a second node (for example, referred to as a "QB node") QB1 and QB2 in response to the clock signal CLK, a first output circuit 260 that outputs an output signal OUT based on a voltage of the first node Q1 and Q2 and a voltage of the second node QB1 and QB2, and a second output circuit 280 that outputs an inverted output signal OUTB inverted from the output signal OUT based on the voltage of the first node Q1 and Q2 and the voltage of the second node QB1 and QB2. In an embodiment, the stage 200 may further include a first transistor T1 connected to the first node Q1 and Q2 and to selectively separate the first node Q1 and Q2 into a first-first node (for example, referred to as a "Q1 node") Q1 and a first-second node Q2 (for example, referred to as a "Q2 node"), a second transistor T2 connected to the second node QB1 and QB2 and to selectively separate the second node QB1 and QB2 into a second-first node (for example, referred to as a "QB1 node") Q1 and a second-second node QB2 (for example, referred to as a "QB2 node"), Each of the first transistor Tl and the second transistor T2 may include a gate which receives a low gate voltage VGL, and may be referred to as an always on transistor ("AOT"). In an embodiment, the first transistor TI may include a gate which receives the low gate voltage VGL, a first terminal connected to the first-first node Q1, and a second terminal connected to the first-second node Q2, and the second transistor T2 may include a gate which receives the low gate voltage VGL, a first terminal connected to the second-first node QB1, and a second terminal connected to the second-second node QB2.

The first input circuit 220 may include a third transistor T3 that transfers the input signal SIN to the first-first node Q1 in response to the clock signal CLK (or an inverted clock signal in a case where the stage 200 is an even-numbered stage). The input signal SIN may be a start signal if the stage 200 is a first stage of the driver, and may be an output signal of a previous stage if the stage 200 is a subsequent stage of the driver. In an embodiment, the third transistor T3 may include a gate which receives the clock signal CLK, a first terminal which receives the input signal SIN, and a second terminal connected to the first-first node Q1.

The second input circuit 240 may include a fourth transistor T4 that transfers the inverted input signal SINB to the second-first node QB 1 in response to the clock signal CLK (or the inverted clock signal in the case where the stage 200 is the even-numbered stage). The inverted input signal SINB may be an inverted start signal if the stage 200 is the first stage, and may be an inverted output signal of the previous stage if the stage 200 is the subsequent stage. In an embodiment, the fourth transistor T4 may include a gate which receives the clock signal CLK, a first terminal which receives the inverted input signal SINB, and a second terminal connected to the second-first node QB1.

The first output circuit 260 may output the low gate voltage VGL as the output signal OUT in response to the voltage of the first node Q1 and Q2, or a voltage of the first-second node Q2, and may output a high gate voltage VGH as the output signal OUT in response to the voltage of the second node QB1 and QB2, or a voltage of the second-second node QB2. To perform these operations, the first output circuit 260 may include a first capacitor C1 which is connected between the first-second node Q2 and an output node NO from which the output signal OUT is output, and which boosts the voltage of the first-second node Q2, a fifth transistor T5 which outputs the low gate voltage VGL as the output signal OUT in response to the voltage of the first-second node Q2, and a sixth transistor T6 which outputs the high gate voltage VGH as the output signal OUT in response to the voltage of the second-second node QB2. In an embodiment, the first capacitor C1 may include a first electrode connected to the first-second node Q2, and a second electrode connected to the output node NO, the fifth transistor T5 may include a gate connected to the first-second node Q2, a first terminal which receives the low gate voltage VGL, and a second terminal connected to the output node NO, and the sixth transistor T6 may include a gate connected to the second-second node QB2, a first terminal connected to the output node NO, and a second terminal which receives the high gate voltage VGH.

The second output circuit 280 may output the high gate voltage VGH as the inverted output signal OUTB in response to the voltage of the first node Q1 and Q2, or the voltage of the first-second node Q2, and may output the low gate voltage VGL as the inverted output signal OUTB in response to the voltage of the second node QB1 and QB2, or the voltage of the second-second node QB2. To perform these operations, the second output circuit 280 may include a seventh transistor T7 which outputs the high gate voltage VGH as the inverted output signal OUTB in response to the voltage of the first-second node Q2, a second capacitor C2 which is connected between the second-second node QB2 and an inverted output node NOB from which the inverted output signal OUTB is output, and which boosts the voltage of the second-second node QB2, and an eighth transistor T8 which outputs the low gate voltage VGL as the inverted output signal OUTB in response to the voltage of the second-second node QB2. In an embodiment, the seventh transistor T7 may include a gate connected to the first-second node Q2, a first terminal which receives the high gate voltage VGH, and a second terminal connected to the inverted output node NOB, the second capacitor C2 may include a first electrode connected to the second-second node QB2, and a second electrode connected to the inverted output node NOB, and the eighth transistor T8 may include a gate connected to the second-second node QB2, a first terminal connected to the inverted output node NOB, and a second terminal which receives the low gate voltage VGL.

In an embodiment, as illustrated in FIG. 3, the first through eighth transistors T1 through T8 included in the stage 200 may be P-type metal oxide semiconductor ("PMOS") transistors. Further, for example, the first through eighth transistors T1 through T8 may be low-temperature polycrystalline silicon ("LTPS") transistors. In other embodiments, at least one of the first through eighth transistors T1 through T8 may be an N-type metal oxide semiconductor ("NMOS") transistor. For example, at least one of the first through eighth transistors T1 through T8 may be an oxide transistor including an active region having an oxide semiconductor.

As described above, the first output circuit 260 and the second output circuit 280 of the stage 200 may share (or may be commonly connected to) the first node Q1 and Q2 (for example, the first-second node Q2) and the second node QB1 and QB2 (for example, the second-second node QB2), and may respectively output the output signal OUT having the low gate voltage VGL and the inverted output signal OUTB having the high gate voltage VGH based on the voltage of the same first node Q1 and Q2 and the voltage of the same second node QB1 and QB2. For example, the stage 200 may output both the output signal OUT and the inverted output signal OUTB inverted from the output signal OUT. Further, the stage 200 may have an 8T2C structure including eight transistors T1 through T8 and two capacitors C1 and C2. Thus, the stage 200 may have a simple configuration and a small size while outputting both the output signal OUT and the inverted output signal OUTB. Accordingly, the driver including the stage 200 may be suitable for an embedded driver that is integrated into the display panel.

Hereinafter, an example of an operation of the stage 200 will be described below with reference to FIGS. 4 through 6.

Figure 4:
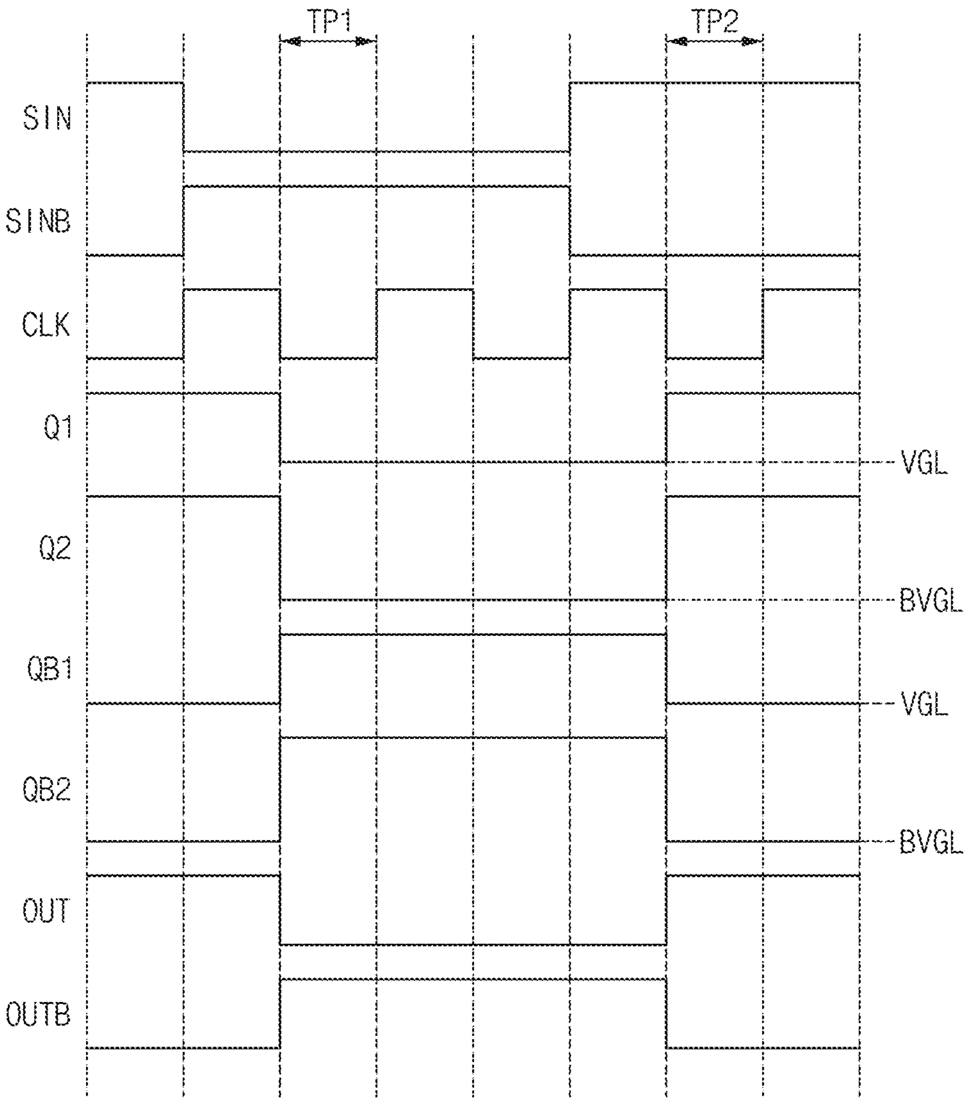
FIG. 4 is a timing diagram for describing an example of an operation of a stage of FIG. 3.
Figure 5:
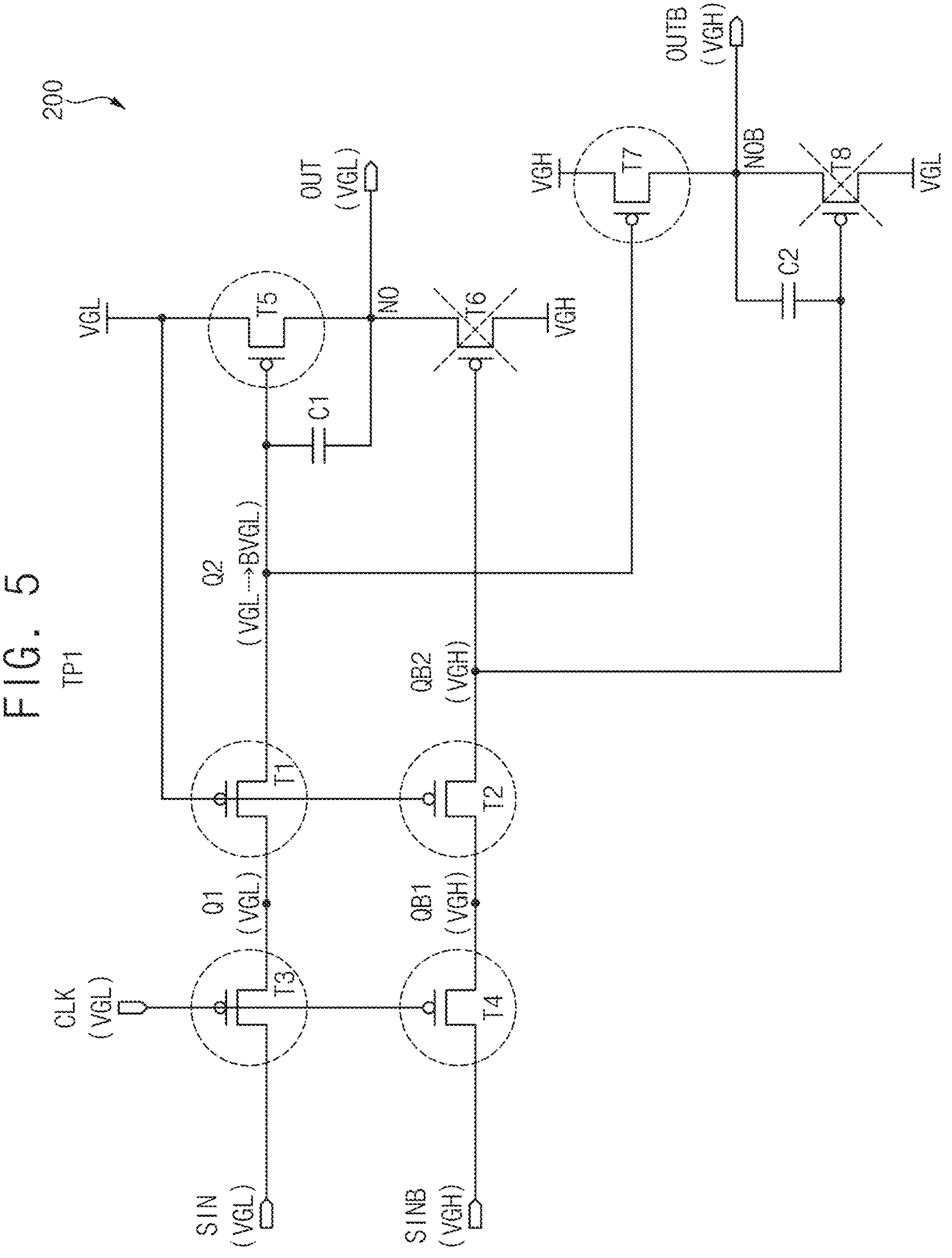
FIG. 5 is a schematic diagram of an equivalent circuit for describing an example of an operation of a stage of FIG. 3 in a first time period.
Figure 6:
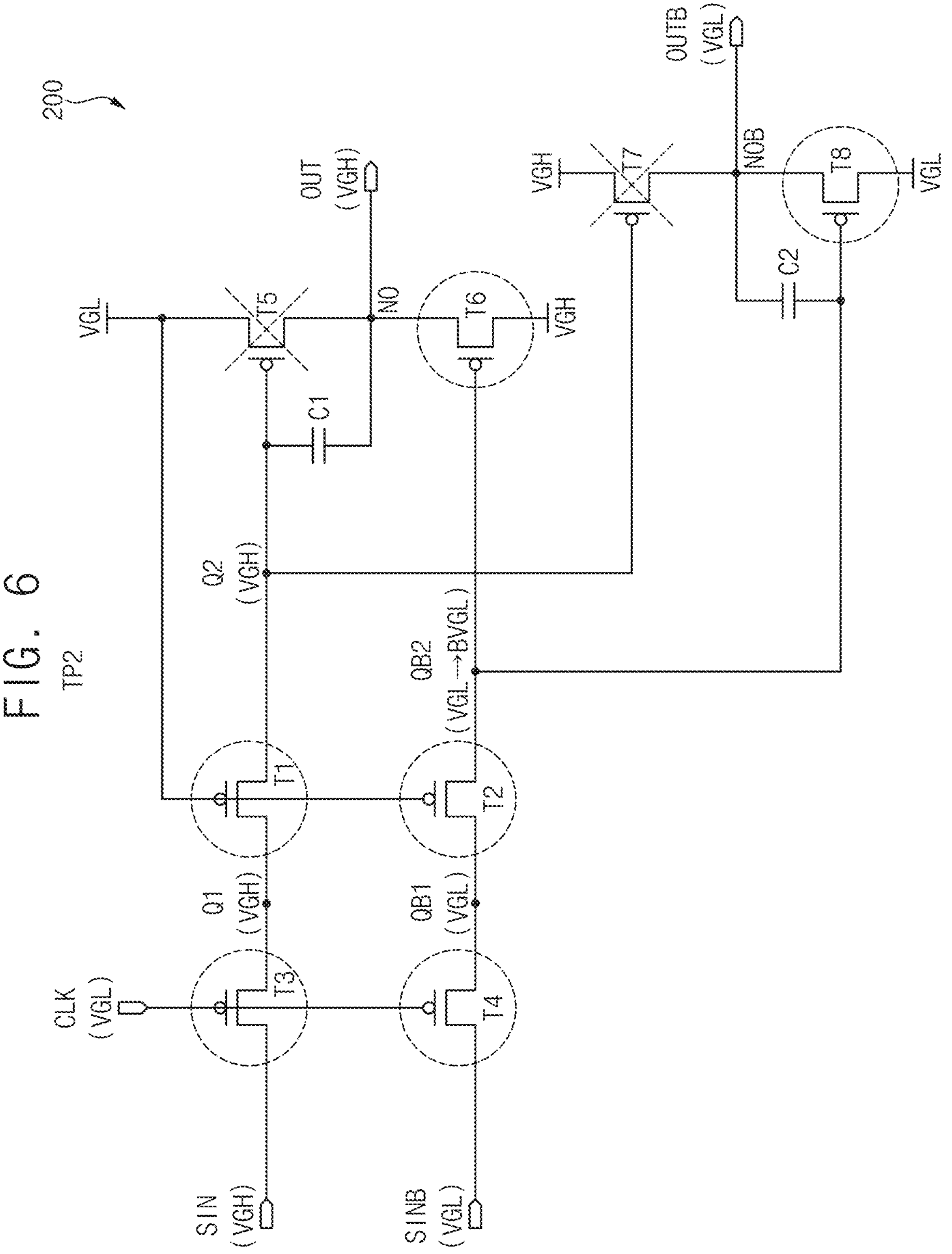
FIG. 6 is a schematic diagram of an equivalent circuit for describing an example of an operation of a stage of FIG. 3 in a second time period.

FIG. 4 is a timing diagram for describing an example of an operation of a stage of FIG. 3, FIG. 5 is a schematic diagram of an equivalent circuit for describing an example of an operation of a stage of FIG. 3 in a first time period, and FIG. 6 is a schematic diagram of an equivalent circuit for describing an example of an operation of a stage of FIG. 3 in a second time period.

Referring to FIGS. 4 and 5, in a first time period TP1 in which the clock signal CLK becomes the low gate voltage VGL while the input signal SIN has the low gate voltage VGL and the inverted input signal SINB has the high gate voltage VGH, the third transistor T3 and the fourth transistor T4 may be turned on in response to the clock signal CLK having the low gate voltage VGL. The third transistor T3 may transfer the input signal SIN having the low gate voltage VGL to the first-first node Q1, and the fourth transistor T4 may transfer the inverted input signal SINB having the high gate voltage VGH to the second-first node QB1. Thus, the first-first node Q1 may have the low gate voltage VGL, and the second-first node QB1 may have the high gate voltage VGH.

The first transistor T1 and the second transistor T2 may be turned on in response to the low gate voltage VGL. The first transistor T1 may transfer the low gate voltage VGL of the first-first node Q1 to the first-second node Q2, and the second transistor T2 may transfer the high gate voltage VGH of the second-first node QB1 to the second-second node QB2. Thus, the first-second node Q2 may have the low gate voltage VGL, and the second-second node QB2 may have the high gate voltage VGH.

Further, the fifth transistor T5 may be turned on in response to the low gate voltage VGL of the first-second node Q2. Thus, the fifth transistor T5 may transfer the low gate voltage VGL to the output node NO. For example, a voltage of the output node NO connected to the second electrode of the first capacitor C1 may be decreased from the high gate voltage VGH to the low gate voltage VGL. In case that the voltage of the output node NO connected to the second electrode of the first capacitor C1 is decreased, by coupling of the first capacitor C1, the voltage of the first-second node Q2 connected to the first electrode of the first capacitor C1 also may be decreased. Accordingly, the voltage of the first-second node Q2 may be decreased from the low gate voltage VGL to a boosted low gate voltage BVGL. This operation may be referred to as a boosting operation by the first capacitor C1. Further, since the boosted low gate voltage BVGL lower than the low gate voltage VGL is applied to the gate of the fifth transistor T5, the fifth transistor T5 may be fully or completely turned on to output the low gate voltage VGL as the output signal OUT.

Although the voltage of the first-second node Q2 is decreased to the boosted low gate voltage BVGL, since the low gate voltage VGL applied to the gate of the first transistor T1 is higher than the boosted low gate voltage BVGL of the first-second node Q2, the first transistor T1 may prevent the boosted low gate voltage BVGL of the first-second node Q2 from being transferred to the first-first node Q1. Accordingly, the first transistor T1 may prevent the current reverse flow that causes the input signal SIN to be distorted by the boosted low gate voltage BVGL of the first-second node Q2.

Further, the seventh transistor T7 may be turned on in response to the boosted low gate voltage BVGL of the first-second node Q2, and may output the high gate voltage VGH as the inverted output signal OUTB. Further, the sixth transistor T6 and the eighth transistor T8 may be turned off in response to the high gate voltage VGH of the second-second node QB2.

Referring to FIGS. 4 and 6, in a second time period TP2 in which the clock signal CLK becomes the low gate voltage VGL while the input signal SIN has the high gate voltage VGH and the inverted input signal SINB has the low gate voltage VGL, the third transistor T3 and the fourth transistor T4 may be turned on in response to the clock signal CLK having the low gate voltage VGL. The third transistor T3 may transfer the input signal SIN having the high gate voltage VGH to the first-first node Q1, and the fourth transistor T4 may transfer the inverted input signal SINB having the low gate voltage VGL to the second-first node QB1. Thus, the first-first node Q1 may have the high gate voltage VGH, and the second-first node QB1 may have the low gate voltage VGL.

The first transistor T1 and the second transistor T2 may be turned on in response to the low gate voltage VGL. The first transistor T1 may transfer the high gate voltage VGH of the first-first node Q1 to the first-second node Q2, and the second transistor T2 may transfer the low gate voltage VGL of the second-first node QB1 to the second-second node QB2. Thus, the first-second node Q2 may have the high gate voltage VGH, and the second-second node QB2 may have the low gate voltage VGL.

Further, the eighth transistor T8 may be turned on in response to the low gate voltage VGL of the second-second node QB2. Thus, the eighth transistor T8 may transfer the low gate voltage VGL to the inverted output node NOB. For example, a voltage of the inverted output node NOB connected to the second electrode of the second capacitor C2 may be decreased from the high gate voltage VGH to the low gate voltage VGL. In case that the voltage of the inverted output node NOB connected to the second electrode of the second capacitor C2 is decreased, by coupling of the second capacitor C2, the voltage of the second-second node QB2 connected to the first electrode of the second capacitor C2 also may be decreased. Accordingly, the voltage of the second-second node QB2 may be decreased from the low gate voltage VGL to the boosted low gate voltage BVGL. This operation may be referred to as a boosting operation by the second capacitor C2. Further, since the boosted low gate voltage BVGL lower than the low gate voltage VGL is applied to the gate of the eighth transistor T8, the eighth transistor T8 may be fully or completely turned on to output the low gate voltage VGL as the inverted output signal OUTB.

Although the voltage of the second-second node QB2 is decreased to the boosted low gate voltage BVGL, since the low gate voltage VGL applied to the gate of the second transistor T2 is higher than the boosted low gate voltage BVGL of the second-second node QB2, the second transistor T2 may prevent the boosted low gate voltage BVGL of the second-second node QB2 from being transferred to the second-first node QB1. Accordingly, the second transistor T2 may prevent the current reverse flow that causes the inverted input signal SINB to be distorted by the boosted low gate voltage BVGL of the second-second node QB2.

Further, the sixth transistor T6 may be turned on in response to the boosted low gate voltage BVGL of the second-second node QB2, and may output the high gate voltage VGH as the output signal OUT. Further, the fifth transistor T5 and the seventh transistor T7 may be turned off in response to the high gate voltage VGH of the first-second node Q2.

In this manner, the stage 200 may have a simple configuration and a small size while outputting both the output signal OUT and the inverted output signal OUTB.

Figure 7:
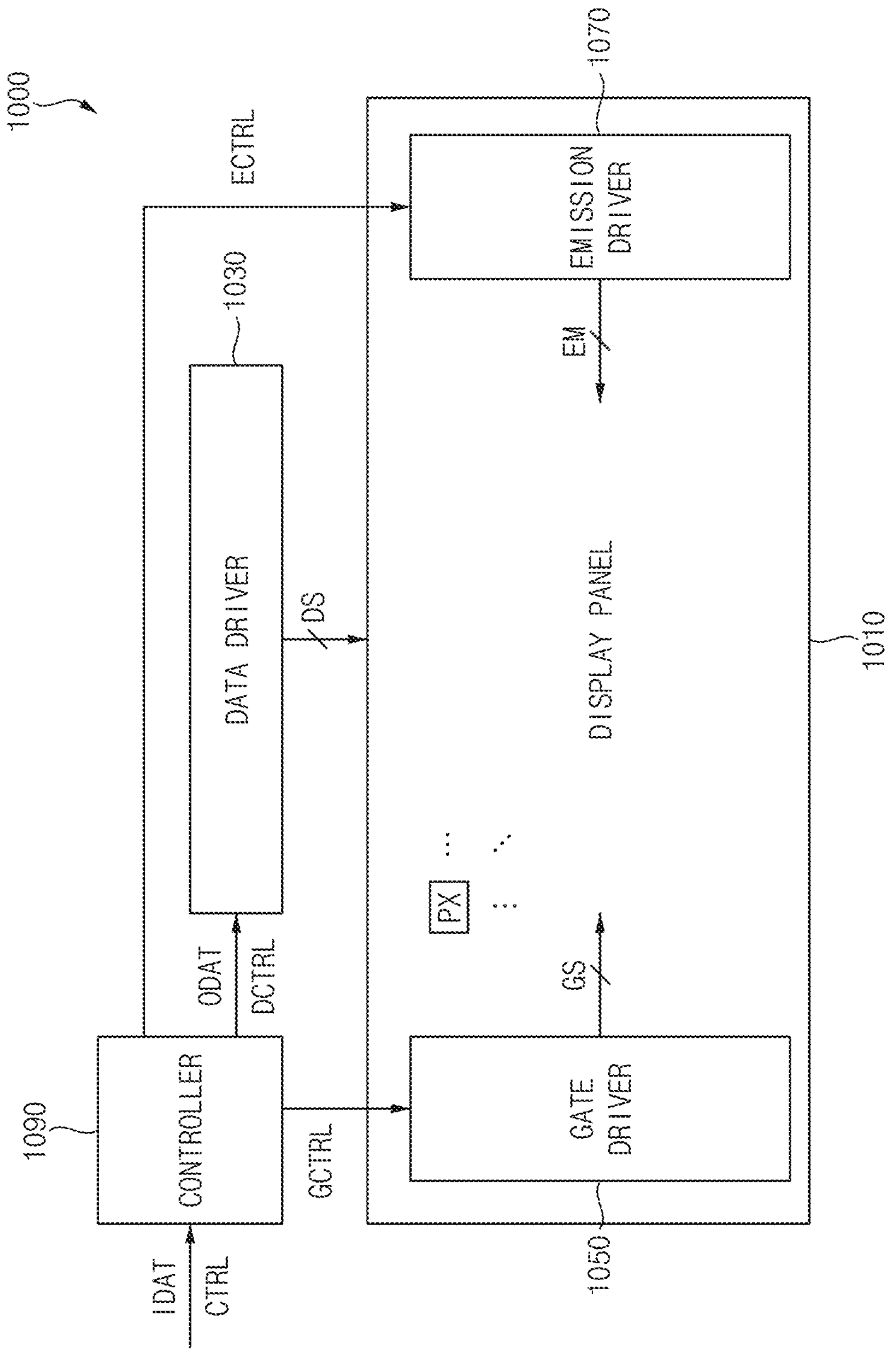
FIG. 7 is a block diagram illustrating a display device according to embodiments.
Figure 8:
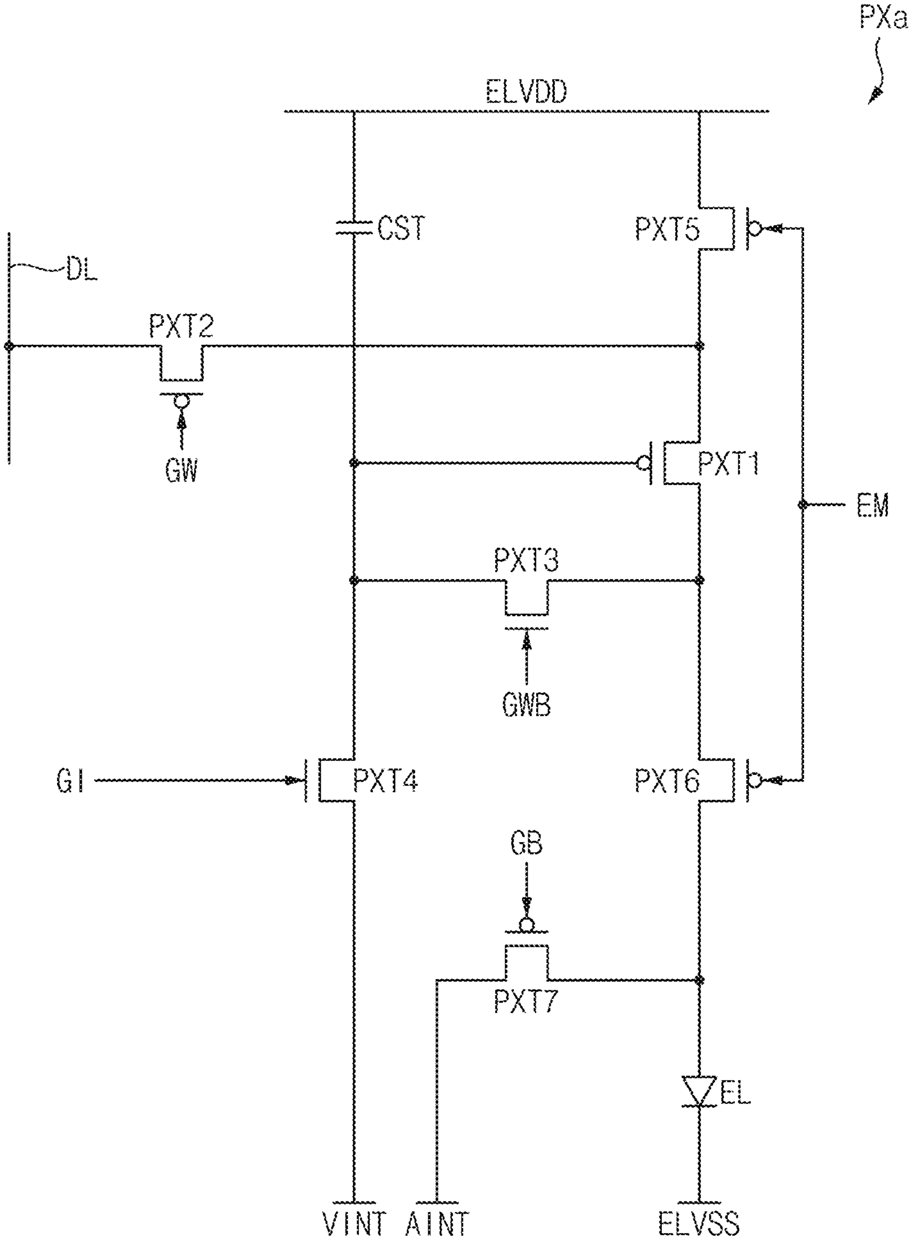
FIG. 8 is a schematic diagram of an equivalent circuit illustrating an example of a pixel included in a display device according to embodiments.
Figure 9:
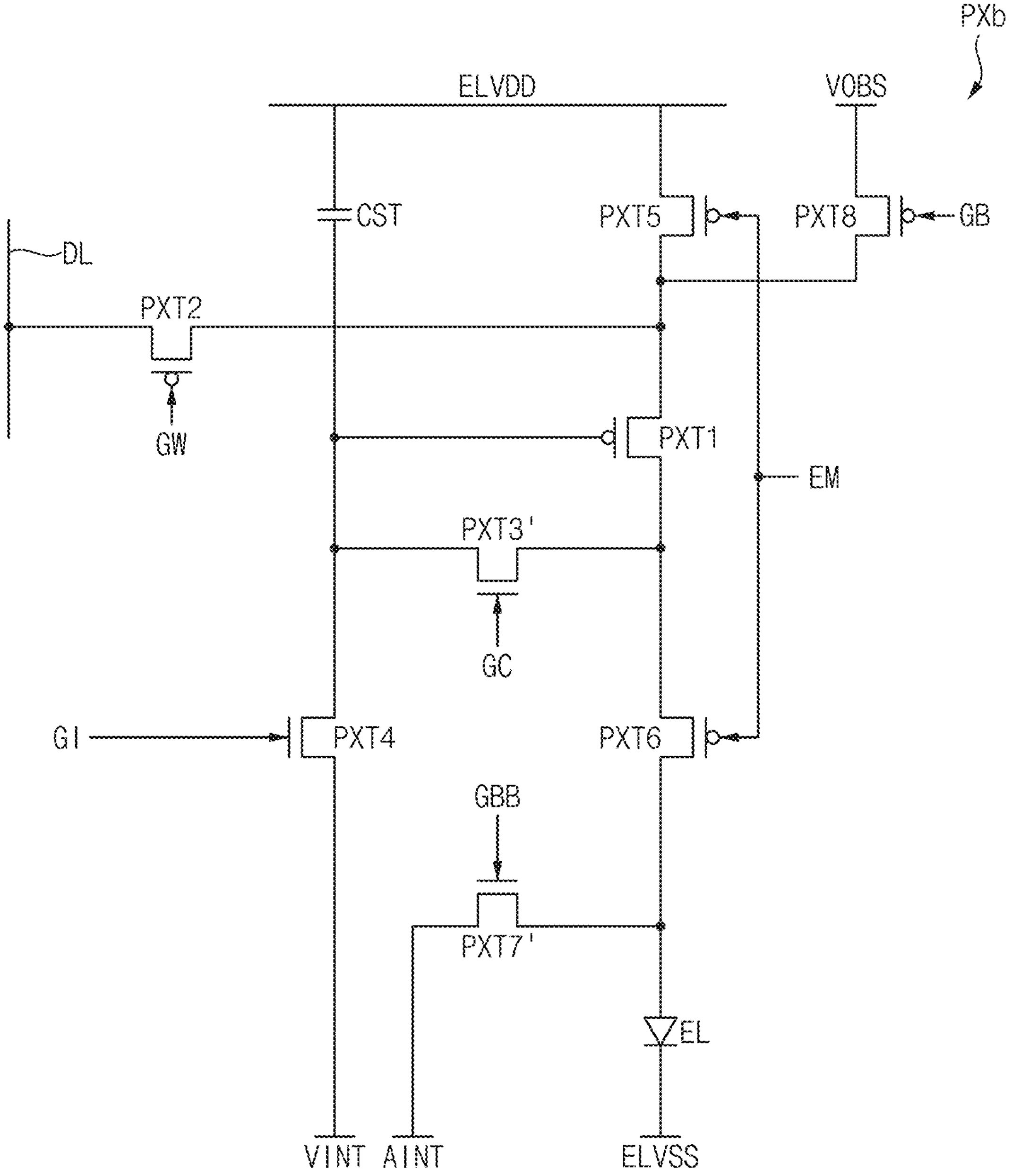
FIG. 9 is a schematic diagram of an equivalent circuit illustrating another example of a pixel included in a display device according to embodiments.
Figure 10:
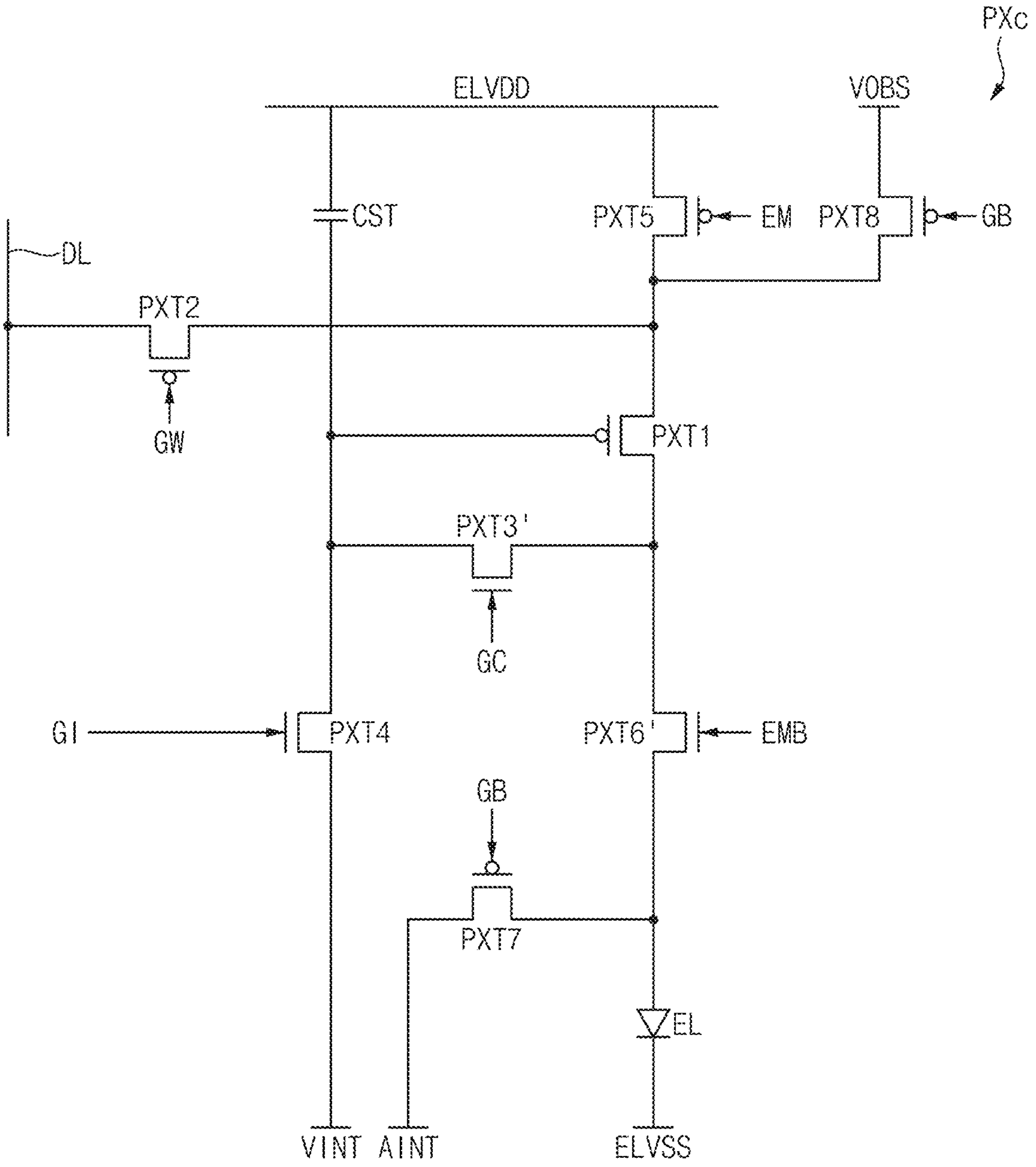
FIG. 10 is a schematic diagram of an equivalent circuit illustrating another example of a pixel included in a display device according to embodiments.

FIG. 7 is a block diagram illustrating a display device according to embodiments, FIG. 8 is a schematic diagram of an equivalent circuit illustrating an example of a pixel included in a display device according to embodiments, FIG. 9 is a schematic diagram of an equivalent circuit illustrating another example of a pixel included in a display device according to embodiments, and FIG. 10 is a schematic diagram of an equivalent circuit illustrating another example of a pixel included in a display device according to embodiments.

Referring to FIG. 7, a display device 1000 according to embodiments may include a display panel 1010 that may include a plurality of pixels PX, a data driver 1030 that provides data signals DS to the plurality of pixels PX, a gate driver 1050 that provides gate signals GS to the plurality of pixels PX, an emission driver 1070 that provides emission signals EM to the plurality of pixels PX, and a controller 1090 that controls the data driver 1030, the gate driver 1050 and the emission driver 1070.

The display panel 1010 may include data lines, gate lines, emission lines, and the plurality of pixels PX connected thereto. In an embodiment, as illustrated in FIG. 8, the gate signals GS applied to each pixel PXa may include a write signal GW, an inverted write signal GWB inverted from the write signal GW, an initialization signal GI, and a bypass signal GB, and each pixel PXa may include a storage capacitor CST, first, second, third, fourth, fifth, sixth and seventh pixel transistors PXT1, PXT2, PXT3, PXT4, PXT5, PXT6 and PXT7 and a light emitting element EL.

The storage capacitor CST may store the data signal DS transferred through the second pixel transistor PXT2 and the (diode-connected) first pixel transistor PXT1. In an embodiment, the storage capacitor CST may include a first electrode which receives a first power supply voltage ELVDD (for example, a high power supply voltage), and a second electrode connected to a gate of the first pixel transistor PXT1.

The first pixel transistor PXT1 may generate a driving current based on the data signal DS stored in the storage capacitor CST. In an embodiment, the first transistor T1 may include the gate connected to the second electrode of the storage capacitor CST, a first terminal connected to the second and fifth pixel transistors PXT2 and PXT5, and a second terminal connected to the third and sixth pixel transistors PXT3 and PXT6.

The second pixel transistor PXT2 may transfer the data signal DS of a data line DL to the first terminal of the first pixel transistor PXT1 in response to the write signal GW. In an embodiment, the second pixel transistor PXT2 may include a gate which receives the write signal GW, a first terminal connected to the data line DL, and a second terminal connected to the first terminal of the first pixel transistor PXT1.

The third pixel transistor PXT3 may diode-connect the first pixel transistor PXT1 in response to the inverted write signal GWB. In an embodiment, the third pixel transistor PXT3 may include a gate which receives the inverted write signal GWB, a first terminal connected to the second terminal of the first pixel transistor PXT1, and a second terminal connected to the gate of the first pixel transistor PXT1.

The fourth pixel transistor PXT4 may apply an initialization voltage VINT to the storage capacitor CST and the gate of the first pixel transistor PXT1 in response to the initialization signal GI. In an embodiment, the fourth pixel transistor PXT4 may include a gate which receives the initialization signal GI, a first terminal connected to the storage capacitor CST and the gate of the first pixel transistor PXT1, and a second terminal which receives the initialization voltage VINT.

The fifth and sixth pixel transistors PXT5 and PXT6 may form a path for the driving current from a line which transfers the first power supply voltage ELVDD to a line which transfers a second power supply voltage ELVSS (for example, a low power supply voltage) in response to the emission signal EM. In an embodiment, the fifth pixel transistor PXT5 may include a gate which receives the emission signal EM, a first terminal which receives the first power supply voltage ELVDD, and a second terminal connected to the first terminal of the first pixel transistor PXT1, and the sixth pixel transistor PXT6 may include a gate which receives the emission signal EM, a first terminal connected to the second terminal of the first pixel transistor PXT1, and a second terminal connected to an anode of the light emitting element EL.

The seventh pixel transistor PXT7 may apply an anode initialization voltage AINT to the anode of the light emitting element EL in response to the bypass signal GB. In an embodiment, the seventh pixel transistor PXT7 may include a gate which receives the bypass signal GB, a first terminal which receives the anode initialization voltage AINT, and a second terminal connected to the anode of the light emitting element EL.

The light emitting element EL may emit light based on the driving current generated by the first pixel transistor PXT1. In an embodiment, the light emitting element EL may be, but is not limited to, an organic light emitting diode ("OLED"). In other embodiments, the light emitting element EL may be any suitable light emitting element. For example, the light emitting element EL may be a micro-light emitting diode, a nano light emitting diode (NED), a quantum dot (QD) light emitting diode, an inorganic light emitting diode, or any other suitable light emitting element. In an embodiment, the light emitting element EL may include the anode connected to the second terminal of the sixth pixel transistor PXT6 and the second terminal of the seventh pixel transistor PXT7, and a cathode which receives the second power supply voltage ELVSS.

In an embodiment, as illustrated in FIG. 8, the first, second, fifth, sixth and seventh pixel transistors PXT1, PXT2, PXT5, PXT6 and PXT7 may be PMOS transistors, and the third and fourth pixel transistors PXT3 and PXT4 of which terminals are directly connected to the storage capacitor CST may be NMOS transistors. In this case, since the NMOS transistors have a relatively small leakage current compared with the PMOS transistors, the distortion of the data signal DS stored in the storage capacitor CST may be reduced.

Further, in an embodiment, the second pixel transistor PXT2 may be the PMOS transistor which receives the write signal GW, the third pixel transistor PXT3 may be the NMOS transistor which receives the inverted write signal GWB inverted from the write signal GW, and the same stage (for example, a stage 200 illustrated in FIG. 3) of the gate driver 1050 may output both the write signal GW and the inverted write signal GWB.

In other embodiments, as illustrated in FIG. 9, the gate signals GS applied to each pixel PXb may include the write signal GW, a compensation signal GC, the initialization signal GI, the bypass signal GB, and an inverted bypass signal GBB inverted from the bypass signal GB, and each pixel PXb may include the storage capacitor CST, the first pixel transistor PXT1, the second pixel transistor PXT2, a third pixel transistor PXT3', the fourth pixel transistor PXT4, the fifth pixel transistor PXT5, the sixth pixel transistor PXT6, a seventh pixel transistor PXT7', an eighth pixel transistor PXT8 and the light emitting element EL. The pixel PXb of FIG. 9 may have a similar configuration and a similar operation to the pixel PXa of FIG. 8, except that the third pixel transistor PXT3' may receive the compensation signal GC instead of the inverted write signal GWB, the seventh pixel transistor PXT7' may receive the inverted bypass signal GBB instead of the bypass signal GB, and the pixel PXb may further include the eighth pixel transistor PXT8 which receives the bypass signal GB.

The third pixel transistor PXT3' may include a gate which receives the compensation signal GC, a first terminal connected to the second terminal of the first pixel transistor PXT1, and a second terminal connected to the gate of the first pixel transistor PXT1. The seventh pixel transistor PXT7' may include a gate which receives the inverted bypass signal GBB, a first terminal which receives the anode initialization voltage AINT, and a second terminal connected to the anode of the light emitting element EL.

The eighth pixel transistor PXT8 may provide a bias voltage VOBS to the first terminal (for example, a source) of the first pixel transistor PXT1 in response to the bypass signal GB. In an embodiment, the eighth pixel transistor PXT8 may include a gate which receives the bypass signal GB, a first terminal which receives the bias voltage VOBS, and a second terminal connected to the first terminal of the first pixel transistor PXT1.

As illustrated in FIG. 9, the first, second, fifth, sixth and eighth pixel transistors PXT1, PXT2, PXT5, PXT6 and PXT8 may be PMOS transistors, and the third, fourth and seventh pixel transistors PXT3', PXT4 and PXT7' may be NMOS transistors. Further, the eighth pixel transistor PXT8 may be the PMOS transistor which receives the bypass signal GB, the seventh pixel transistor PXT7' may be the NMOS transistor which receives the inverted bypass signal GBB inverted from the bypass signal GB, and the same stage (for example, the stage 200 illustrated in FIG. 3) of the gate driver 1050 may output both the bypass signal GB and the inverted bypass signal GBB.

In other embodiments, as illustrated in FIG. 10, the gate signals GS applied to each pixel PXc may include the write signal GW, the compensation signal GC, the initialization signal GI and the bypass signal GB, and each pixel PXc may include the storage capacitor CST, the first pixel transistor PXT1, the second pixel transistor PXT2, the third pixel transistor PXT3', the fourth pixel transistor PXT4, the fifth pixel transistor PXT5, a sixth pixel transistor PXT6', the seventh pixel transistor PXT7, the eighth pixel transistor PXT8 and the light emitting element EL. The pixel PXc of FIG. 10 may have a similar configuration and a similar operation to the pixel PXa of FIG. 8, except that the third pixel transistor PXT3' may receive the compensation signal GC instead of the inverted write signal GWB, the sixth pixel transistor PXT6' may receive an inverted emission signal EMB instead of the emission signal EM, and the pixel PXc may further include the eighth pixel transistor PXT8 which receives the bypass signal GB.

The sixth pixel transistor PXT6' may include a gate which receives the inverted emission signal EMB inverted from the emission signal EM, a first terminal connected to the second terminal of the first pixel transistor PXT1, and a second terminal connected to the anode of the light emitting element EL.

As illustrated in FIG. 10, the first, second, fifth, seventh and eighth pixel transistors PXT1, PXT2, PXT5, PXT7 and PXT8 may be PMOS transistors, and the third, fourth and sixth pixel transistors PXT3', PXT4 and PXT6' may be NMOS transistors. Further, the fifth pixel transistor PXT5 may be the PMOS transistor which receives the emission signal EM, the sixth pixel transistor PXT6' may be the NMOS transistor which receives the inverted emission signal EMB inverted from the emission signal EM, and the same stage (for example, the stage 200 illustrated in FIG. 3) of the emission driver 1070 may output both the emission signal EM and the inverted emission signal EMB.

Although FIGS. 8 through 10 illustrates examples in which each pixel PXa, PXb and PXc has a 7T1C structure or an 8T1C structure including seven or eight pixel transistors and one capacitor, a structure of the pixel PX of the display device 1000 according to embodiments is not limited to the examples illustrated in FIGS. 8 through 10.

The data driver 1030 may generate the data signals DS based on a data control signal DCTRL and output image data ODAT received from the controller 1090, and may provide the data signals DS to the plurality of pixels PX through the data lines. In an embodiment, the data control signal DCTRL may include, but is not limited to, an output data enable signal, a horizontal start signal and a load signal. In an embodiment, the data driver 1030 and the controller 1090 may be implemented as a single integrated circuit, and the single integrated circuit may be referred to as a timing controller embedded data driver (TED) integrated circuit. In other embodiments, the data driver 1030 and the controller 1090 may be implemented as separate integrated circuits.

The gate driver 1050 may generate the gate signals GS based on a gate control signal GCTRL received from the controller 1090, and may sequentially provide the gate signals GS to the plurality of pixels PX on a row-by-row basis through the gate lines. In an embodiment, the gate control signal GCTRL may include, but is not limited to, a gate start signal and a gate clock signal. In an embodiment, the gate driver 1050 may be a driver 100 of FIG. 1 including the stage 200 of FIG. 3. Further, in an embodiment, as illustrated in FIG. 7, the gate driver 1050 may be integrated or formed in the display panel 1010. For example, the gate driver 1050 may be integrated or formed in a display region of the display panel 1010 in which the plurality of pixels PX are formed. In another example, the gate driver 1050 may be integrated or formed in a peripheral region of the display panel 1010 adjacent to the display region. In other embodiments, the gate driver 1050 may be implemented with one or more integrated circuits.

Figure 11:
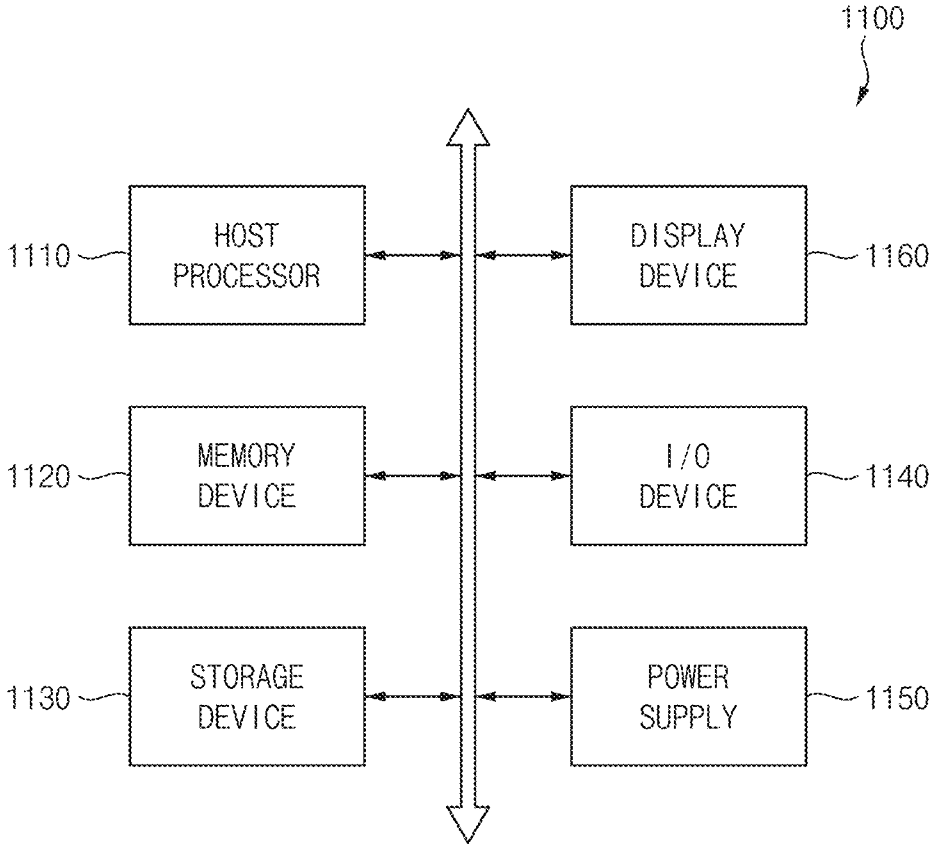
FIG. 11 is a block diagram illustrating an electronic device including a display device according to embodiments.

The emission driver 1070 may generate the emission signals EM based on an emission control signal ECTRL received from the controller 1090, and may sequentially provide the emission signals EM to the plurality of pixels PX on a row-by-row basis through the emission lines. In an embodiment, the emission control signal ECTRL may include, but is not limited to, an emission start signal and an emission clock signal. In an embodiment, the emission driver 1070 may be a driver 100 of FIG. 1 including a stage 200 of FIG. 3. Further, in an embodiment, as illustrated in FIG. 11, the emission driver 1070 may be integrated or formed in the display panel 1010. For example, the emission driver 1070 may be integrated or formed in the display region of the display panel 1010. In another example, the emission driver 1070 may be integrated or formed in the peripheral region of the display panel 1010. In other embodiments, the emission driver 1070 may be implemented with one or more integrated circuits.

The controller 1090 (for example, a timing controller) may receive input image data IDAT and a control signal CTRL from an external host processor (for example, a graphics processing unit (GPU), an application processor (AP) or a graphics card). In an embodiment, the input image data IDAT may be RGB image data including red image data, green image data and blue image data. In an embodiment, the control signal CTRL may include, but is not limited to, a vertical synchronization signal, a horizontal synchronization signal, an input data enable signal, a master clock signal, etc. The controller 1090 may generate the output image data ODAT, the data control signal DCTRL, the gate control signal GCTRL and the emission control signal ECTRL based on the input image data IDAT and the control signal CTRL. The controller 1090 may control an operation of the data driver 1030 by providing the output image data ODAT and the data control signal DCTRL to the data driver 1030, may control an operation of the gate driver 1050 by providing the gate control signal GCTRL to the gate driver 1050, and may control an operation of the emission driver 1070 by providing the emission control signal ECTRL to the emission driver 1070.

In the display device 1000 according to embodiments, at least one of the gate driver 1050 and the emission driver 1070 may be implemented as the driver 100 of FIG. 1, and at least one stage of the driver 100 may output both an output signal and an inverted output signal while having a simple configuration (for example, an 8T2C structure) and a small size.

FIG. 11 is a block diagram illustrating an electronic device including a display device according to embodiments.

Referring to FIG. 11, an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a micro-processor, a central processing unit (CPU), etc. The processor 1110 may be connected to other components via an address bus, a control bus, a data bus, etc. Further, in an embodiment, the processor 1110 may be further connected to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be connected to other components through the buses or other communication links.

In the display device 1160, at least one stage of a driver (for example, a gate driver and/or an emission driver) may output both an output signal and an inverted output signal while having a simple configuration (for example, an 8T2C structure) and a small size.

The disclosure may be applied to any display device 1160, and any electronic device 1100 including the display device 1160. For example, the disclosure may be applied to a smart phone, a wearable electronic device, a mobile phone, a television ("TV") (for example, a digital TV, a three-dimensional ("3D") TV, etc.), a personal computer ("PC") (for example, a tablet computer, a laptop computer, etc.), a home appliance, a personal digital assistant ("PDA"), a portable multimedia player ("PMP"), a digital camera, a music player, a portable game console, a navigation device, etc.

The foregoing is illustrative of embodiments and is not to be construed as limiting thereof. Although embodiments have been described, those skilled in the art will readily appreciate that many modifications are possible in the embodiments without materially departing from the novel teachings and advantages of the disclosure. Accordingly, all such modifications are intended to be included within the scope of the disclosure and as defined in the claims. Therefore, it is to be understood that the foregoing is illustrative of various embodiments and is not to be construed as limited to the embodiments disclosed, and that modifications to the disclosed embodiments, as well as other embodiments, are intended to be included within the scope of the appended claims.

What is claimed is:

1. A driver comprising:

a plurality of stages, at least one stage of the plurality of stages comprising:

a first input circuit that transfers an input signal to a first node in response to a clock signal;

a second input circuit that transfers an inverted input signal inverted from the input signal to a second node in response to the clock signal;

a first output circuit that outputs a low gate voltage as an output signal in response to a voltage of the first node, and that outputs a high gate voltage as the output signal in response to a voltage of the second node; and a second output circuit that outputs the high gate voltage as an inverted output signal inverted from the output signal in response to the voltage of the first node, and that outputs the low gate voltage as the inverted output signal in response to the voltage of the second node.

2. The driver of claim 1, wherein the at least one stage further comprises:

a first transistor connected to the first node, and to selectively separate the first node into a first-first node and a first-second node; and a second transistor connected to the second node, and to selectively separate the second node into a second-first node and a second-second node.

3. The driver of claim 2, wherein each of the first transistor and the second transistor is an always-on transistor including a gate which receives the low gate voltage.

4. The driver of claim 2, wherein the first transistor includes a gate which receives the low gate voltage, a first terminal connected to the first-first node, and a second terminal connected to the first-second node, and wherein the second transistor includes a gate which receives the low gate voltage, a first terminal connected to the second-first node, and a second terminal connected to the second-second node.

5. The driver of claim 2, wherein the first input circuit includes a third transistor that transfers the input signal to the first-first node in response to the clock signal.

6. The driver of claim 5, wherein the third transistor includes a gate which receives the clock signal, a first terminal which receives the input signal, and a second terminal connected to the first-first node.

7. The driver of claim 2, wherein the second input circuit includes a fourth transistor that transfers the inverted input signal to the second-first node in response to the clock signal.

8. The driver of claim 7, wherein the fourth transistor includes a gate which receives the clock signal, a first terminal which receives the inverted input signal, and a second terminal connected to the second-first node.

9. The driver of claim 2, wherein the first output circuit includes:

a first capacitor connected between the first-second node and an output node from which the output signal is output, and that boosts a voltage of the first-second node;

a fifth transistor that outputs the low gate voltage as the output signal in response to the voltage of the first-second node; and a sixth transistor that outputs the high gate voltage as the output signal in response to a voltage of the second-second node.

10. The driver of claim 9, wherein the first capacitor includes a first electrode connected to the first-second node, and a second electrode connected to the output node, wherein the fifth transistor includes a gate connected to the first-second node, a first terminal which receives the low gate voltage, and a second terminal connected to the output node, and wherein the sixth transistor includes a gate connected to the second-second node, a first terminal connected to the output node, and a second terminal which receives the high gate voltage.

11. The driver of claim 2, wherein the second output circuit includes:

a seventh transistor that outputs the high gate voltage as the inverted output signal in response to a voltage of the first-second node;

a second capacitor connected between the second-second node and an inverted output node from which the inverted output signal is output, and that boosts a voltage of the second- second node; and an eighth transistor that outputs the low gate voltage as the inverted output signal in response to the voltage of the second-second node.

12. The driver of claim 11, wherein the seventh transistor includes a gate connected to the first-second node, a first terminal which receives the high gate voltage, and a second terminal connected to the inverted output node, wherein the second capacitor includes a first electrode connected to the second-second node, and a second electrode connected to the inverted output node, and wherein the eighth transistor includes a gate connected to the second-second node, a first terminal connected to the inverted output node, and a second terminal which receives the low gate voltage.

13. The driver of claim 1, wherein transistors included in the at least one stage are P-type metal oxide semiconductor transistors.

14. A driver comprising:

a plurality of stages, at least one stage of the plurality of stages comprising:

a first transistor including a gate which receives a low gate voltage, a first terminal connected to a first-first node, and a second terminal connected to a first-second node;

a second transistor including a gate which receives the low gate voltage, a first terminal connected to a second-first node, and a second terminal connected to a second-second node;

a third transistor including a gate which receives a clock signal, a first terminal which receives an input signal, and a second terminal connected to the first-first node;

a fourth transistor including a gate which receives the clock signal, a first terminal which receives an inverted input signal, and a second terminal connected to the second-first node;

a first capacitor including a first electrode connected to the first-second node, and a second electrode connected to an output node;

a fifth transistor including a gate connected to the first-second node, a first terminal which receives the low gate voltage, and a second terminal connected to the output node;

a sixth transistor including a gate connected to the second-second node, a first terminal connected to the output node, and a second terminal which receives a high gate voltage;

a seventh transistor including a gate connected to the first-second node, a first terminal which receives the high gate voltage, and a second terminal connected to an inverted output node;

a second capacitor including a first electrode connected to the second-second node, and a second electrode connected to the inverted output node; and an eighth transistor including a gate connected to the second-second node, a first terminal connected to the inverted output node, and a second terminal which receives the low gate voltage.

15. The driver of claim 14, wherein the first transistor, the second transistor, the third transistor, the fourth transistor, the fifth transistor, the sixth transistor, the seventh transistor and the eighth transistor are P-type metal oxide semiconductor transistors.

16. An electronic device comprising:

a display device comprising:

a display panel including a plurality of pixels;

a data driver that provides data signals to the plurality of pixels;

a gate driver that provides gate signals to the plurality of pixels;

an emission driver that provides emission signals to the plurality of pixels; and a controller that controls the data driver, the gate driver and the emission driver, wherein at least one of the gate driver and the emission driver includes a plurality of stages, and wherein at least one stage of the plurality of stages includes:

a first input circuit that transfers an input signal to a first node in response to a clock signal;

a second input circuit that transfers an inverted input signal inverted from the input signal to a second node in response to the clock signal;

a first output circuit that outputs a low gate voltage as an output signal in response to a voltage of the first node, and that outputs a high gate voltage as the output signal in response to a voltage of the second node; and a second output circuit that outputs the high gate voltage as an inverted output signal inverted from the output signal in response to the voltage of the first node, and that outputs the low gate voltage as the inverted output signal in response to the voltage of the second node.

17. The electronic device of claim 16, wherein the gate signals include a write signal, an inverted write signal inverted from the write signal, an initialization signal and a bypass signal, and each of the plurality of pixels includes:

a storage capacitor including a first electrode which receives a first power supply voltage, and a second electrode;

a first pixel transistor including a gate connected to the second electrode of the storage capacitor, a first terminal, and a second terminal;

a second pixel transistor including a gate which receives the write signal, a first terminal connected to a data line, and a second terminal connected to the first terminal of the first pixel transistor;

a third pixel transistor including a gate which receives the inverted write signal, a first terminal connected to the second terminal of the first pixel transistor, and a second terminal connected to the gate of the first pixel transistor;

a fourth pixel transistor including a gate which receives the initialization signal, a first terminal connected to the gate of the first pixel transistor, and a second terminal which receives an initialization voltage;

a fifth pixel transistor including a gate which receives a corresponding emission signal, a first terminal which receives the first power supply voltage, and a second terminal connected to the first terminal of the first pixel transistor;

a sixth pixel transistor including a gate which receives the corresponding emission signal, a first terminal connected to the second terminal of the first pixel transistor, and a second terminal;

a seventh pixel transistor including a gate which receives the bypass signal, a first terminal which receives an anode initialization voltage, and a second terminal; and a light emitting element including an anode connected to the second terminal of the sixth pixel transistor and the second terminal of the seventh pixel transistor, and a cathode which receives a second power supply voltage, and wherein the output signal output from the first output circuit is the write signal, and the inverted output signal output from the second output circuit is the inverted write signal.

18. The electronic device of claim 16, wherein the gate signals include a write signal, a compensation signal, an initialization signal, a bypass signal and an inverted bypass signal inverted from the bypass signal, and each of the plurality of pixels includes:

a storage capacitor including a first electrode which receives a first power supply voltage, and a second electrode;

a first pixel transistor including a gate connected to the second electrode of the storage capacitor, a first terminal, and a second terminal;

a second pixel transistor including a gate which receives the write signal, a first terminal connected to a data line, and a second terminal connected to the first terminal of the first pixel transistor;

a third pixel transistor including a gate which receives the compensation signal, a first terminal connected to the second terminal of the first pixel transistor, and a second terminal connected to the gate of the first pixel transistor;

a fourth pixel transistor including a gate which receives the initialization signal, a first terminal connected to the gate of the first pixel transistor, and a second terminal which receives an initialization voltage;

a fifth pixel transistor including a gate which receives a corresponding emission signal, a first terminal which receives the first power supply voltage, and a second terminal connected to the first terminal of the first pixel transistor;

a sixth pixel transistor including a gate which receives the corresponding emission signal, a first terminal connected to the second terminal of the first pixel transistor, and a second terminal;

a seventh pixel transistor including a gate which receives the inverted bypass signal, a first terminal which receives an anode initialization voltage, and a second terminal;

an eighth pixel transistor including a gate which receives the bypass signal, a first terminal which receives a bias voltage, and a second terminal connected to the first terminal of the first pixel transistor; and a light emitting element including an anode connected to the second terminal of the sixth pixel transistor and the second terminal of the seventh pixel transistor, and a cathode which receives a second power supply voltage, and wherein the output signal output from the first output circuit is the bypass signal, and the inverted output signal output from the second output circuit is the inverted bypass signal.

19. The electronic device of claim 16, wherein the gate signals include a write signal, a compensation signal, an initialization signal and a bypass signal, and each of the plurality of pixels includes:

a storage capacitor including a first electrode which receives a first power supply voltage, and a second electrode;

a first pixel transistor including a gate connected to the second electrode of the storage capacitor, a first terminal, and a second terminal;

a second pixel transistor including a gate which receives the write signal, a first terminal connected to a data line, and a second terminal connected to the first terminal of the first pixel transistor;

a third pixel transistor including a gate which receives the compensation signal, a first terminal connected to the second terminal of the first pixel transistor, and a second terminal connected to the gate of the first pixel transistor;

a fourth pixel transistor including a gate which receives the initialization signal, a first terminal connected to the gate of the first pixel transistor, and a second terminal which receives an initialization voltage;

a fifth pixel transistor including a gate which receives a corresponding emission signal, a first terminal which receives the first power supply voltage, and a second terminal connected to the first terminal of the first pixel transistor;

a sixth pixel transistor including a gate which receives an inverted emission signal inverted from the corresponding emission signal, a first terminal connected to the second terminal of the first pixel transistor, and a second terminal;

a seventh pixel transistor including a gate which receives the bypass signal, a first terminal which receives an anode initialization voltage, and a second terminal;

an eighth pixel transistor including a gate which receives the bypass signal, a first terminal which receives a bias voltage, and a second terminal connected to the first terminal of the first pixel transistor; and a light emitting element including an anode connected to the second terminal of the sixth pixel transistor and the second terminal of the seventh pixel transistor, and a cathode which receives a second power supply voltage, and wherein the output signal output from the first output circuit is the corresponding emission signal, and the inverted output signal output from the second output circuit is the inverted emission signal.

20. The electronic device of claim 16, wherein the at least one stage further includes:

a first transistor that separates the first node into a first-first node and a first-second node, and including a gate which receives the low gate voltage, a first terminal connected to the first-first node, and a second terminal connected to the first-second node; and a second transistor that separates the second node into a second-first node and a second-second node, and including a gate which receives the low gate voltage, a first terminal connected to the second-first node, and a second terminal connected to the second-second node, the first input circuit includes:

a third transistor including a gate which receives the clock signal, a first terminal which receives the input signal, and a second terminal connected to the first-first node, the second input circuit includes:

a fourth transistor including a gate which receives the clock signal, a first terminal which receives the inverted input signal, and a second terminal connected to the second- first node, the first output circuit includes:

a first capacitor including a first electrode connected to the first-second node, and a second electrode connected to an output node from which the output signal is output;

a fifth transistor including a gate connected to the first-second node, a first terminal which receives the low gate voltage, and a second terminal connected to the output node; and a sixth transistor including a gate connected to the second-second node, a first terminal connected to the output node, and a second terminal which receives the high gate voltage, and the second output circuit includes:

a seventh transistor including a gate connected to the first-second node, a first terminal which receives the high gate voltage, and a second terminal connected to an inverted output node from which the inverted output signal is output;

a second capacitor including a first electrode connected to the second-second node, and a second electrode connected to the inverted output node; and an eighth transistor including a gate connected to the second-second node, a first terminal connected to the inverted output node, and a second terminal which receives the low gate voltage.

* * * * *